March 10, 1964
A. G. BARON
3,124,122
OIL HEATER FOR COOKING SYSTEM
Filed Nov. 6, 1961
2 Sheets-Sheet 1
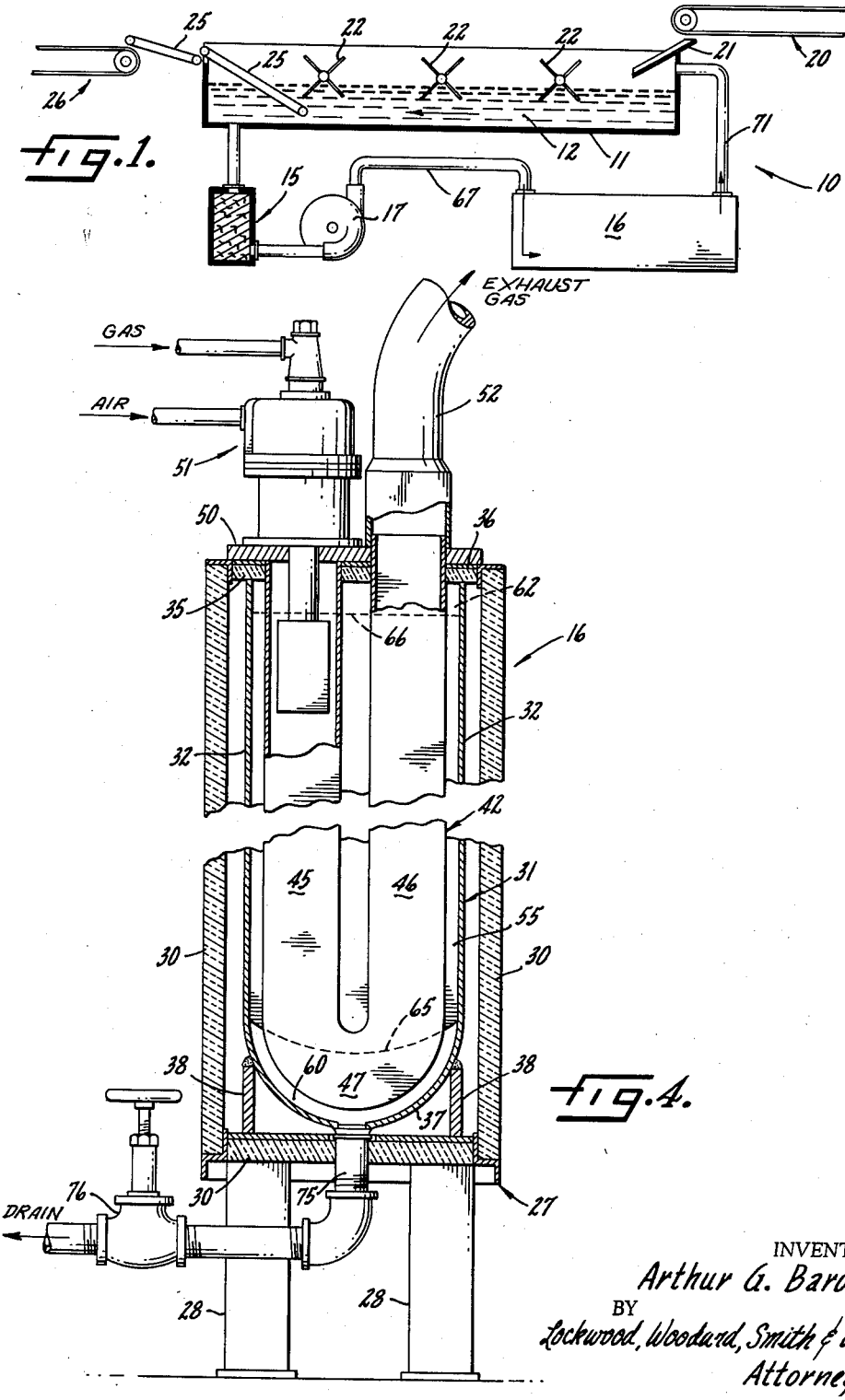
INVENTOR.
Arthur G. Baron,
BY
Lockwood, Woodard, Smith & Weikart
Attorneys.

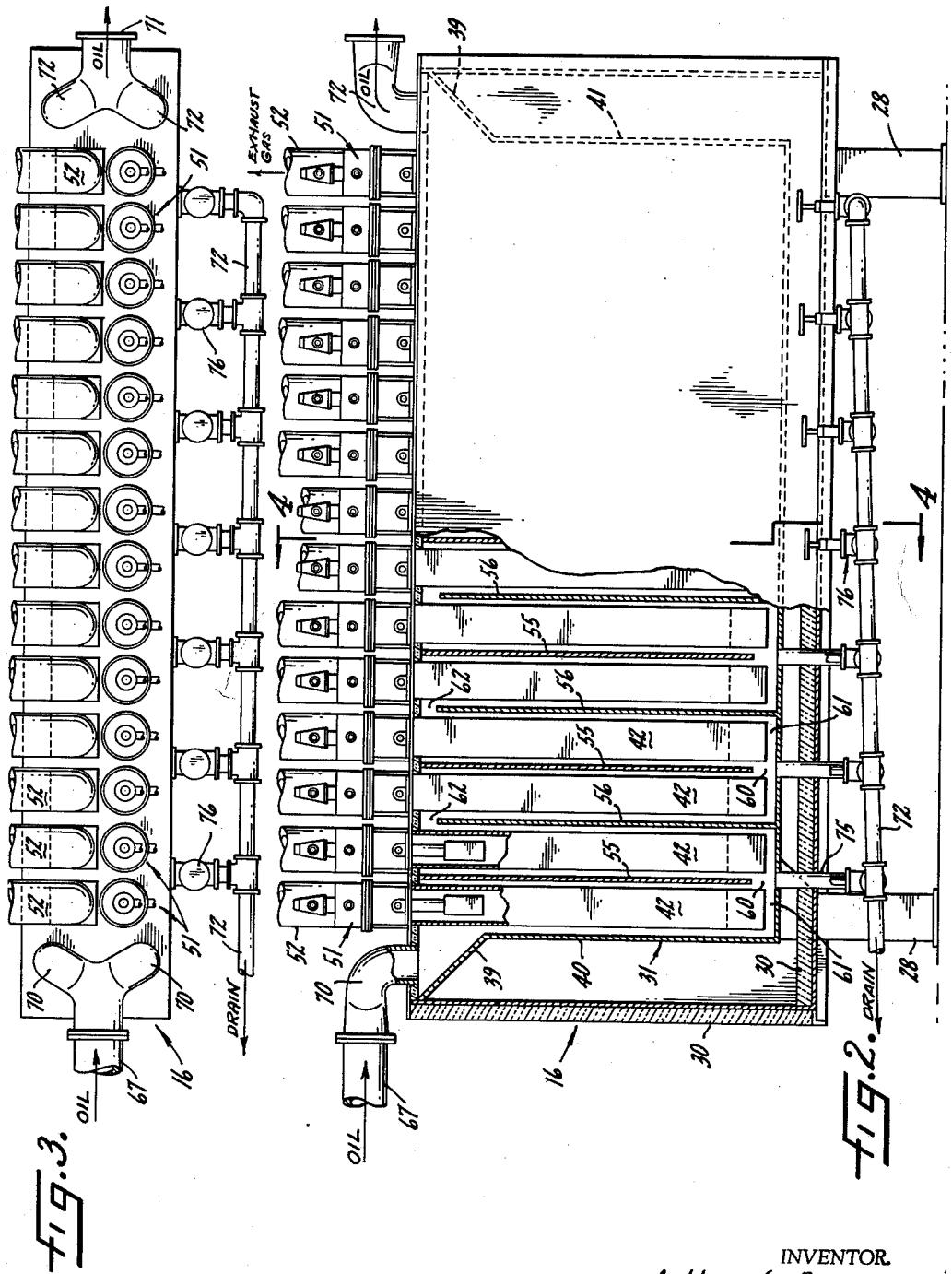

United States Patent Office 3,124,122
Patented Mar. 10, 1964

3,124,122
OIL HEATER FOR COOKING SYSTEM
Arthur G. Baron, 1321 N. Mitchner St.,
Indianapolis, Ind.
Filed Nov. 6, 1961, Ser. No. 150,339
1 Claim. (Cl. 126—360)

The present invention relates to cooking systems particularly adapted for cooking of potato chips and the like and more particularly to a heater or heat exchanger finding particular utility in heating the oil of such a system.

In the preparation of potato chips and similar food products, it is common practice to cook the sliced raw food in oil which has been heated to the necessary temperature. Various devices have been conceived for heating such oil but have been found to have certain limitations. Consequently, a primary object of the present invention is to provide an improved heat exchanger particularly adapted for heating oil in a cooking system.

A further object of the present invention is to provide a heat exchanger capable of heating (or cooling) a fluid with low heat loss.

Still another object of the invention is to provide a heat exchanger constructed to reduce the amount of sediment deposited therein as a result of impure fluid passing therethrough.

Related objects and advantages will become apparent as the description proceeds.

One embodiment of the present invention comprises a fluid-tight upright elongated container having vertical sides, a top, and a bottom which curves smoothly into said sides. A plurality of tubular conduits are received in said container and spaced longitudinally thereof, said conduits being closely spaced to one another and to the walls of said container. Each of the conduits includes an inlet portion extending through the top of the container vertically downwardly into the container and an exhaust portion extending vertically upwardly and out of the container through the top thereof. The inlet and exhaust portions are connected by an intermediate curving portion closely spaced to and having the same shape as the bottom of said container. The container has an inlet at one longitudinal end thereof and an outlet at the other longitudinal end thereof so that liquid may be pumped through said container. There is also provided a plurality of burners each mounted on a respective one of said conduits and arranged to move heated gas into the respective conduit and a plurality of baffles formed of sheet material each fixed to said container between a respective pair of conduits whereby the pumped liquid is caused to follow a tortuous path over the surfaces of the conduits.

The full nature of the invention will be understood from the accompanying drawings and the following description and claim.

FIG. 1 is a schematic illustration of a cooking system incorporating the heat exchanger of the present invention.

FIG. 2 is a side elevation of the heat exchanger with portions shown in section.

FIG. 3 is a top plan view of the heat exchanger of FIG. 2.

FIG. 4 is an enlarged vertical section taken along the line 4—4 of FIG. 2 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a cooking system 10 which includes an elongated receptacle 11 within which cooking oil 12 is received. The cooking oil is circulated through the receptacle along the length thereof and through a filter 15 and heat exchanger 16 by means of a pump 17. Raw sliced potatoes or other raw food to be cooked is transported along a conveyor 20 from which it falls into the receptacle being guided by a chute 21.

Rotatably mounted upon the receptacle is a plurality of paddle wheels 22 which operate to push the food being cooked along the length of the receptacle toward conveyors 25 which lift the cooked food from the receptacle and allow the excess oil to drip therefrom back into the receptacle. The cooked food is then conducted away from the system by means of the conveyor 26. Suitable means are provided for operating the heating means associated with the heat exchanger 16 in response to the temperature of the oil within the receptacle 11 whereby this temperature is maintained within a desired range.

Referring to FIGS. 2–4, the heat exchanger 16 includes an outer frame 27 constructed of suitable angles and channels, supported on legs 28, and having panels 30 of insulation mounted thereon so as to completely surround an inner fluid-tight container 31. The container 31 is upright and elongated in shape and has vertical sidewalls 32, a top 35 of insulating material backed by a supporting sheet 36 and a curved bottom 37 which merges smoothly with the sidewalls 32. Legs 38 are fixed to the container and support it up the frame 27. With the exception of angularly extending portions 39 (one shown), the end walls 40 and 41 of the container are also vertical.

Mounted within the container 31 and spaced along the length thereof is a plurality of conduits 42. Each of the conduits includes a vertically extending inlet portion 45 which passes through the top 35 of the container and a vertically extending outlet portion 46 which also passes through the top of the container. The conduits 42 each have a square shaped cross section all along their length and each further include a curved intermediate portion 47 which joins the inlet and outlet portions 45 and 46 and has a shape corresponding to and curved coaxially with the bottom 37 of the container 31. It will be evident that the conduits 42 are closely spaced to the walls of the container 31 and because of their size and square cross section substantially fill the container.

A horizontally extending plate 50 is mounted on top of the frame 27 and supports a plurality of gas burners 51. These burners are conventional in nature and may be, for example, series 4728-4 radiant tube burners manufactured by the North American Manufacturing Company of Cleveland, Ohio. Each of the burners 51 is mounted so as to extend within a respective one of the conduits 42. Each burner functions to burn gas and to exhaust the products of combustion into the inlet portion 45 of each conduit. These products of combustion pass through the conduits heating the walls thereof and exhaust upwardly out of the exhaust portion 46 into further conduits 52 fixed to the exhaust portion 46 and supported upon the plate 50.

Between each of the burners, there is mounted a baffle 55 or 56 which divides the container into a plurality of sections 61 each containing a single conduit. Each of the baffles 55 is fixed to (or engages in fluid-tight manner) the top and sides of the container 31 but with the container 31 defines an opening 60 at the bottom of the container permitting the flow of oil from one section 61 of the container into an adjacent section 61. Each of the baffles 56 is fixed to the sides and bottom of the container in a fluid-tight manner and has an opening 62 at the top of the container for permitting passage of the oil from one section 61 to an adjacent section 61. Each of the baffles 55 has a convexly curved bottom edge 65 which has a curvature somewhat less than the curvature of the bottom 37 of the container 31. The curved edge 65 of the baffles insures that the oil passes as low as possible across the burner tubes so that the oil circulates past as much of the burner tubes as possible. Each of the baffles 56 has a straight upper edge 66 whereby the openings 62 are rectangular in shape so that the oil flows uniformly over the conduits.

The pump 17 (FIG. 1) is connected to the heat exchanger by means of piping 67 which opens into the heat exchanger after dividing into dual portions 70. Each of the dual portions is suitably mounted upon the top 35 of the container so as to extend through a pair of circular openings therethrough. The oil is exhausted from the container 31 through piping 71 including dual portions 72 mounted upon the top of the container similarly to the piping 67.

In operation, the pump 17 functions to move the oil through the container 31. As the oil is so pumped, it flows through the piping 67 into the container and across the surfaces of the most leftward burner conduit 42 as viewed in FIG. 2. The oil flows downwardly through the opening 60 and over substantially all of the surface of the second most leftward burner tube. After flow upwardly through the second most leftward section 61, the oil flows through the opening 62 into the next adjacent section and repeats the above flow path until the oil exhausts through the piping 71.

Because of the square shaped cross section of each conduit and because of the fact that conduits substantially fill the container 31, the flow of oil is at a relatively great velocity. This high velocity acts to wash the surfaces of the container, baffles and conduits preventing sediment within the cooking oil from collecting on the surfaces. Because of the fact that the burner conduits 42 are inside of the container and inside of the oil flowing therethrough, the heat loss is relatively low. The insulation 30 and 35 also functions to reduce the heat loss.

Even though the oil flows at a relatively great velocity, a certain amount of sediment will collect in the bottom of the container 31. At predetermined intervals, this sediment may be drained away through piping 72 which is connected by a plurality of sections 75 to the container 31 adjacent each of the openings 60. The flow of oil from the section 75 into the piping 72 is controlled by a plurality of valves 76. It will be noted that the piping 72 has a downward inclination to assist this draining operation.

From the above description, it will be clear that the present invention provides an improved heat exchanger particularly adapted for heating oil in a cooking system. It will also be clear that the heat exchanger of the present invention is capable of heating (or cooling) a fluid with low heat loss. It will also be evident that the heat exchanger of the present invention is so constructed as to reduce the amount of sediment which is collected as a result of impure fluid passing therethrough.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A heat exchanger for heating cooking oil and the like comprising a fluid-tight upright elongated container having vertical sides, a top and a bottom which curves smoothly into said sides;

a plurality of tubular conduits received in said container and spaced longitudinally therealong, said conduits being closely spaced to one another and to the walls of said container, each of said conduits including an inlet portion extending through the top of the container vertically downwardly into the container and an exhaust portion extending vertically upwardly and out of the container through the top thereof, said inlet and exhaust portions being connected by an intermediate curving portion closely spaced to and having the same shape as the bottom of said container, said intermediate curving portion being equally spaced from the bottom of the container all along the length of the intermediate portion, each of said conduits having a square cross section whereby the conduit fills a greater portion of the container;

said container having an inlet at one longitudinal end thereof and an outlet at the other longitudinal end thereof, means for pumping liquid through said container from said inlet to said outlet;

a plurality of burners each mounted on a respective one of said conduits and arranged to move heated gas into the inlet portion of the respective conduit;

a plurality of baffles formed of sheet material each fixed to said container between the conduits of a different pair of said conduits and dividing up said container into a plurality of sections each having a single conduit therein, said baffles being of two alternating types along the length of the container, one of which types is secured in fluid-tight manner to the top and sides of the container and provides communication between adjacent sections only adjacent the bottom of said container and the other of which types is secured to the bottom and sides of the container and provides communication between adjacent sections only adjacent the top of said container;

the baffles of said one type having a convexly curved bottom edge and the baffles of said other type having a straight top edge;

and heat insulation surrounding said container.

References Cited in the file of this patent

UNITED STATES PATENTS

| | | |
|---|---|---|
| 65,547 | Crighton | June 11, 1867 |
| 830,248 | Von Orth | Sept. 4, 1906 |
| 846,379 | Ambrose | Mar. 5, 1907 |
| 895,926 | Wickham | Aug. 11, 1908 |
| 2,047,080 | Maniscalco | July 7, 1936 |
| 2,452,391 | O'Sullivan | Oct. 26, 1948 |
| 2,515,618 | Wallerius | July 18, 1950 |
| 2,594,433 | Hess | Apr. 29, 1952 |
| 2,607,661 | See | Aug. 19, 1952 |